United States Patent
Liu

(10) Patent No.: US 8,335,275 B2
(45) Date of Patent: Dec. 18, 2012

(54) METHOD, DEVICE AND SYSTEM FOR MANAGING LINES

(75) Inventor: Lihe Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 71 days.

(21) Appl. No.: 12/824,019

(22) Filed: Jun. 25, 2010

(65) Prior Publication Data

US 2010/0260282 A1    Oct. 14, 2010

Related U.S. Application Data

(63) Continuation of application No. PCT/CN2008/073559, filed on Dec. 17, 2008.

(30) Foreign Application Priority Data

Dec. 27, 2007 (CN) .......................... 2007 1 0300292
Jan. 21, 2008 (CN) .......................... 2008 1 0004222

(51) Int. Cl.
*H04B 15/00* (2006.01)
(52) U.S. Cl. ...................................................... 375/285
(58) Field of Classification Search .................. 375/285
See application file for complete search history.

(56) References Cited

U.S. PATENT DOCUMENTS

| | | | |
|---|---|---|---|
| 2006/0039456 A1 * | 2/2006 | Bostoen et al. | 375/222 |
| 2008/0188185 A1 | 8/2008 | Shi | |
| 2008/0310520 A1 * | 12/2008 | Schenk | 375/257 |
| 2009/0122855 A1 * | 5/2009 | Duvaut et al. | 375/232 |

FOREIGN PATENT DOCUMENTS

| | | |
|---|---|---|
| CN | 1741406 A | 3/2006 |
| CN | 1863099 A | 11/2006 |
| JP | 62123860 A | 6/1987 |

OTHER PUBLICATIONS

International Search Report issued Mar. 26, 2009 in connection with International Patent Application No. PCT/CN2008/073559.
Written Opinion of the International Search Authority issued Mar. 26, 2009 in connection with International Patent Application No. PCT/CN2008/073559.

* cited by examiner

*Primary Examiner* — David C. Payne
*Assistant Examiner* — Tanmay Shah

(57) ABSTRACT

A method, a device, and a system for managing lines are provided. The method includes: collecting showtime parameters of user lines (11); calculating crosstalk information of the user lines according to the collected showtime parameters (12); and grouping the user lines according to the calculated crosstalk information of the user lines (13). Thus, the dynamic spectrum management (DSM) algorithm is made to be more simple and faster, and the user lines are grouped more directly and exactly.

14 Claims, 2 Drawing Sheets

METHOD, DEVICE AND SYSTEM FOR MANAGING LINES

CROSS-REFERENCE TO RELATED APPLICATIONS

This application is a continuation of International Application No. PCT/CN2008/073559, filed on Dec. 17, 2008, which claims priority to Chinese Patent Application No. 200710300292.0, filed on Dec. 27, 2007 and Chinese Patent Application No. 200810004222.5, filed on Jan. 21, 2008, all of which are hereby incorporated by reference in their entireties.

TECHNICAL FIELD

The present invention relates to the field of communication technology, and more particularly to a method, a device, and a system for managing lines.

BACKGROUND

Dynamic spectrum management (DSM) is adapted to perform optimization management of the transmit frequency spectrum density on each user line, to reduce the crosstalk between the user lines. The DSM aims at realizing a balance between achieving the maximum rate of each modem and reducing the crosstalk influence on other modems by means of adjusting the transmit power.

Currently, many algorithms of DSM power management are available, such as optimum spectrum balancing (OSB) iterative water-filling (IWF), and iterative spectrum balancing (ISB), which are representative algorithms in the DSM.

During the implementation of the present invention, the inventor finds that the algorithms in the prior art have the following disadvantages.

Because an optimal algorithm in the DSM Level 2 algorithms, the OSB algorithm has the best performance, but does not have any practical value due to its excessively high complexity.

The ISB algorithm is an approximate optimal algorithm, and the complexity is much lower, but during practical working, especially when there are many user lines, the ISB algorithm also has large computations.

The IWF algorithmic relatively simple, and does not need a spectrum management device, but the performance of the IWF algorithm is poor in the case of a complex crosstalk environment.

Therefore, DSM Level 2 algorithms with better performances have the characteristics of high complexity and great difficulty in implementation. To make breakthrough in the implementation of the DSM having better performance, it needs to find a method to significantly reduce the optimization complexity of the DSM technology.

SUMMARY

Accordingly, the present invention is directed to a method, a device, and a system for managing lines, which are applicable to simplify complexity of DSM Level 2 optimization algorithms, and make better use of the DSM Level 2 optimization algorithms.

In order to achieve the above objectives, in an embodiment, the present invention provides a method for managing lines, which includes the following steps.

Showtime parameters of user lines are collected.

Crosstalk information of the user lines is calculated according to the showtime parameters.

The user lines are grouped according to the crosstalk information of the user lines.

In an embodiment, the present invention provides a device for managing lines, which includes a collecting unit, a calculating unit, and a grouping unit.

The collecting unit is adapted to collect showtime parameters of user lines.

The calculating unit is adapted to calculate crosstalk information of the user lines according to the showtime parameters.

The grouping unit is adapted to group the user lines according to the crosstalk information.

In an embodiment, the present invention provides a system for managing lines, which includes a device for managing lines and a line terminal.

The device for managing lines is adapted to receive showtime parameters of user lines sent by the link terminal, calculate crosstalk information of the user lines according to the showtime parameters, and group the user lines according to the crosstalk information.

The line terminal is adapted to collect the showtime parameters of the user lines, and send the showtime parameters to the device for managing lines.

According to the embodiments of the present invention, the crosstalk information is calculated by using the showtime parameters of the user lines, and the user lines are grouped according to the calculated crosstalk information, so that the complexity of the DSM Level 2 optimization algorithms is simplified, and the simplified optimization algorithms of the DSM Level 2 are utilized better.

DETAILED DESCRIPTION

The present invention provides a method, a device, and a system for managing lines, applicable to simplify the complexity of the DSM Level 2 optimization algorithms, and make better use of the DSM Level 2 optimization algorithms.

In order to facilitate the understanding of the embodiments of the present invention, hereinafter, the method, the device, and the system for managing lines according to the embodiments of the present invention are described in detail with reference to the drawings.

Figure 1:
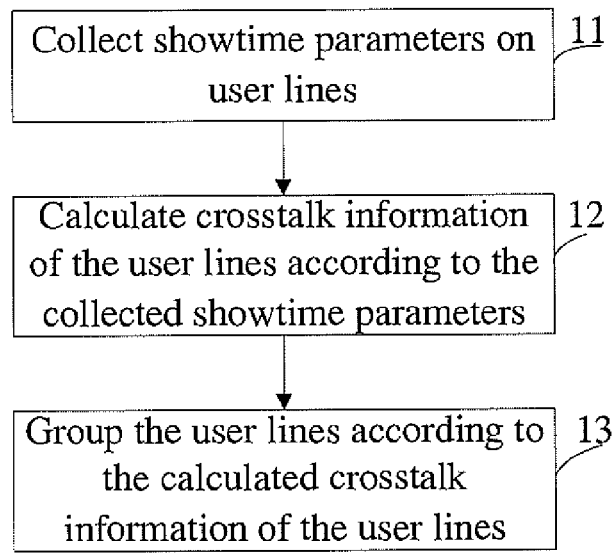
FIG. 1 is a flow chart of a method for managing lines according to an embodiment of the present invention.

FIG. 1 is a flow chart of a method for managing lines according to an embodiment of the present invention. As shown in FIG. 1, the method for managing lines of the embodiment includes the following steps.

In step 11, showtime parameters of user lines are collected.

The spectrum maintenance center (SMC) randomly or periodically sends an instruction for collecting showtime parameters to a line terminal through a DSM-C interface during the operation of digital user lines.

After receiving the instruction for collecting showtime parameters, the line terminal sends the same or similar transmit power spectral density on the user lines simultaneously, and collects showtime parameters of the user lines under the transmit power spectral density.

The showtime parameters mainly include transmit power spectral density of user lines, transmission factor of direct channel, signal to noise ratio margin, background noise power, loaded bit, or signal noise ratio. After the showtime parameters are collected, the line terminal sends the collected showtime parameters to the SMC through a DSM-D interface.

The signal to noise ratio margin, background noise power, and transmission factor of direct channel may also be obtained through experiential values or an experiential model.

In step 12, crosstalk information of the user lines is calculated according to the collected showtime parameters.

According to the Shannon Formula:

$$b_n^k = \log_2\left(1 + \frac{|h_n^{k,k}|^2 s_n^k}{\Gamma\left(\sum_{j\neq k}|h_n^{k,j}|^2 s_n^j + \sigma_n^k\right)}\right) \quad (1)$$

the following formula is derived:

$$\sum_{j\neq k}|h_n^{k,j}|^2 s_n^j = \frac{|h_n^{k,k}|s_n^k}{\Gamma(2^{b_n^k}-1)} - \sigma_n^k \quad (2)$$

wherein, $h_n^{k,j}$ represents the crosstalk information of the $k^{th}$ user line on the $n^{th}$ sub-frequency point;

$S_n^k$ represents the power allocated to the $k^{th}$ user line on the $n^{th}$ sub-frequency point;

$h_n^{kk}$ represents the transmission factor of the $k^{th}$ user line on the $n^{th}$ sub-frequency point;

$\sigma_n^k$ represents the background noise power;

$\Gamma$ represents the signal to noise ratio margin; and $b_n^k$ represents the bit born by the $k^{th}$ user line on the $n^{th}$ sub-frequency point.

Because the line terminal sends the same or similar transmit power spectral density to the user lines simultaneously in step 11, $S_n^j$ and $S_n^k$ Formula (2) are approximately equal to each other, and the left and right sides of Formula (2) are divided by the transmit power spectral density, to obtain the following formula:

$$\sum_{j\neq k}|h_n^{k,j}|^2 = \frac{|h_n^{k,k}|}{\Gamma(2^{b_n^k}-1)} - \frac{\sigma_n^k}{S} \quad (3)$$

Thus, the formula on the right side is calculated through the parameters reported by the line terminal, to obtain the crosstalk information on the left side.

$$\sum_{j\neq k}|h_n^{k,j}|^2$$

is marked as $\mathrm{Info}_n^k$.

Because the working scenarios include long line scenarios and short line scenarios, the magnitudes of the values of the crosstalk information for the long lines and the short lines are different, so that the values of the crosstalk information can be normalized. In the log domain, according to the following formula $$NEXT \approx FEXT - \mathrm{loss}(d,f) \quad (4),$$

the crosstalk information $$\sum_{j\neq k}|h_n^{k,j}|^2$$

is normalized, that is, $$\mathrm{Info}_n^k = \sum_{j\neq k}|h_n^{k,j}|^2 - \mathrm{loss}(d_k, f), \quad (5)$$

wherein, d represents the length of the user line, f represents the value of the frequency point, loss represents the line attenuation model, and FEXT represents the value of the crosstalk information.

Alternatively, in the linear domain, according to the following formula $$NEXT \approx \frac{FEXT}{\mathrm{loss}(d,f)}, \quad (6)$$

the crosstalk information $$\sum_{j\neq k}|h_n^{k,j}|^2$$

is normalized, that is, $$\mathrm{Info}_n^k = \frac{\sum_{j\neq k}|h_n^{k,j}|^2}{\mathrm{loss}(d_k, f)}, \quad (7)$$

wherein, d represents the length of the user line, f represents the value of the frequency point, loss represents the line attenuation model, and FEXT represents the value of the crosstalk information.

In step 13, the user lines are grouped according to the calculated crosstalk information of the user lines.

The user lines may be grouped according to the directly calculated crosstalk information of the user lines, or according to the normalized crosstalk information of the user lines.

When the user lines are grouped according to the calculated crosstalk information of the user lines, the crosstalk information of the user lines may be summed up on the frequency point, that is, $$\sum_{n=1}^{N} Info_n^k.$$

$$\sum_{n=1}^{N} Info_n^k$$

is the grouping information required by the embodiment of the present invention. Each user line has grouping information, and one or more user lines are divided into groups that include user lines having similar grouping information.

The dividing one or more user lines having the similar grouping information includes setting a certain domain value, and dividing user lines into groups that include user lines whose grouping information difference values fall within the certain domain value. The setting of the domain value may be calculated according to the number of groups required by the users accordingly. The more the groups are required, the smaller the domain value is; and the fewer the groups are required, the larger the domain value is.

When the user lines are grouped according to the calculated crosstalk information of the user lines, curve shapes of the crosstalk information of the user lines on the frequency point are compared, and then one or more user lines are divided into groups that include user lines having similar curve shapes or sizes.

In the method for managing lines according to the embodiment of the present invention, the user lines are grouped, that is, each group of user lines is considered as one representative user line, and then optimized by using the DSM Level 2 optimization algorithm, for example, ISB, to calculate the optimal transmit power spectral density of each representative user line. Finally, the calculated transmit power spectral density of the representative user line is converted into a power spectral density mask (PSDMASK) or a reference transmit power spectral density (REFPSD) of the group corresponding to the representative user line, and the IWF is performed on each group of user lines on the basis of the PSDs. Through grouping, the users suitable for using the same PSDMASK or REFPSD are in one group, to simplify the complexity of the DSM Level 2 optimization algorithms, and make better use of the DSM Level 2 optimization algorithms.

The line grouping may also be performed by combining any one of the method for managing lines according to the embodiments of the present invention and other management methods, which can achieve the objectives of the present invention.

Figure 2:
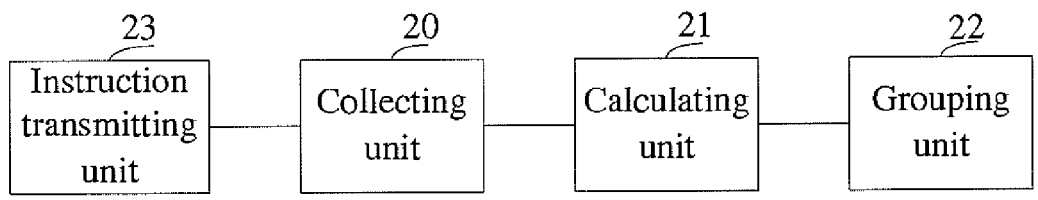
FIG. 2 is a schematic structural view of a device for managing lines according to an embodiment of the present invention.

The method for managing lines according to the embodiment of the present invention is described in detail. In order to better achieve the objective of the present invention, the present invention further provides a device for managing lines. Referring to FIG. 2, the device includes a collecting unit 20, a calculating unit 21, and a grouping unit 22.

The collecting unit 20 is adapted to collect showtime parameters of user lines.

The showtime parameters are collected by a line terminal, and mainly include transmit power spectral density of user lines, transmission factor of direct channel, signal to noise ratio margin, background noise power, loaded bit, or signal noise ratio.

The loaded bit may be obtained by calculating the signal to noise ratio, and the signal to noise ratio margin, background noise power, and transmission factor of direct channel may be obtained through experiential values or an experiential model.

The calculating unit 21 is adapted to calculate crosstalk information of the user lines according to the received showtime parameters.

Specifically, the crosstalk information of the user lines may be calculated according to Formulas (1) and (2).

Because the same or similar transmit power spectral density is sent to the user lines, the $S_n^j$ and the $S_n^k$ in Formula (2) are approximately equal to each other, and the left and right sides of Formula (2) are divided by the transmit power spectral density, to obtain the crosstalk information value $$\sum_{j \neq k} |h_n^{k,j}|^2.$$

The $$\sum_{j \neq k} |h_n^{k,j}|^2$$

is marked as $Info_n^k$.

The grouping unit 22 is adapted to group the user lines according to the calculated crosstalk information of the user lines.

In order to better achieve the objective of the present invention, the device for managing lines further includes an instruction transmitting unit 23.

The instruction transmitting unit 23 is adapted to transmit an instruction for collecting the showtime parameters of the user lines to the line terminal during operation of digital user lines.

The calculating unit 21 is further adapted to replace the crosstalk information with the difference value between the crosstalk information and the line attenuation or the quotient of the crosstalk information and the line attenuation. The specific process is described as follows.

In the log domain, according to Formula (4), the crosstalk information $$\sum_{j \neq k} |h_n^{k,j}|^2$$

is normalized to obtain the crosstalk information value in Formula (5).

Alternatively, in the linear domain, according to Formula (6), the crosstalk information $$\sum_{j \neq k} |h_n^{k,j}|^2$$

is normalized to obtain the crosstalk information value in Formula (7).

Figure 3:
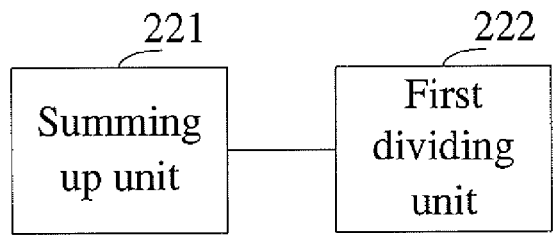
FIG. 3 is a schematic structural view of a grouping unit of the device for managing lines according to an embodiment of the present invention.

The grouping unit 22, as shown in FIG. 3, specifically includes a summing up unit 221 and a first dividing unit 222.

The summing up unit 221 is adapted to sum up the crosstalk information of the user lines on a frequency point, i.e., $$\sum_{n=1}^{N} Info_n^k,$$

which is grouping information required by the embodiment of the present invention.

The first dividing unit 222 is adapted to divide one or more user lines into groups that include user lines having similar grouping information according to the grouping information of the user lines.

The dividing one or more user lines into groups that include user lines having the similar grouping information includes setting a certain domain value, and then dividing user lines into groups that include user lines whose grouping information difference values fall within the certain domain value. The setting of the domain value may be calculated according to the number of groups required by the users accordingly. The more the groups are required, the smaller the domain value is; and the fewer the groups are required, the larger the domain value is.

Figure 4:
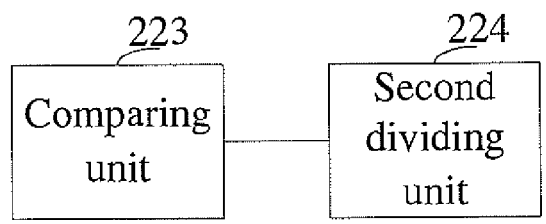
FIG. 4 is a schematic structural view of another grouping unit of the device for managing lines according to an embodiment of the present invention.

The grouping unit 22, as shown in FIG. 4, specifically includes a comparing unit 223 and a second dividing unit 224.

The comparing unit 223 is adapted to compare curve shapes or sizes of the crosstalk information of the user lines on a frequency point according to the crosstalk information of the user lines.

The second dividing unit 224 is adapted to divide user lines into groups that include user lines having the crosstalk information with similar curve shapes or sizes.

Through the device for managing lines according to the embodiment of the present invention, the user lines are grouped, that is, each group of user lines is considered as one representative user line, and then optimized by using the DSM Level 2 optimization algorithm, for example, ISB, to calculate the optimal transmit power spectral density of each representative user line. Finally, the calculated transmit power spectral density of the representative user line is converted into a PSDMASK or a REFPSD of the group corresponding to the representative user line, and the IWF is performed on each group of user lines on the basis of the PSDs. Through grouping, the users suitable for using the same PSD-MASK or REFPSD are in one group, to simplify the complexity of the DSM Level 2 optimization algorithms, and make better use of the DSM Level 2 optimization algorithms.

Figure 5:
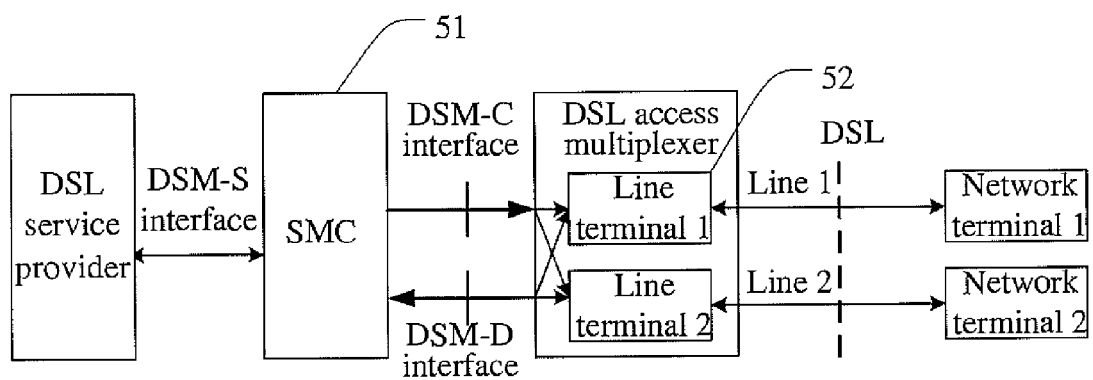
FIG. 5 is a schematic structural view of a system for managing lines according to an embodiment of the present invention.

The present invention further provides a system for managing lines, which includes a device for managing lines and a line terminal. The device for managing lines may be an SMC. As shown in FIG. 5, the SMC has three control interfaces, namely, DSM-S, DSM-C, and DSM-D. The SMC reads parameters of user lines such as working state from the line terminal through the DSM-D interface, and exchanges information with a correlated SMC through the DSM-S interface. When the SMC has collected sufficient information, the SMC performs a series of optimization algorithms, and finally delivers control parameters to the line terminal through the DSM-C interface, thereby making the line work at an optimal state. The SMC may also be integrated in a DSL access multiplexer. Hereinafter, the system is described in detail.

The device for managing lines (the SMC shown in FIG. 5) 51 is adapted to receive showtime parameters reported by the line terminal 52, and calculate crosstalk information of user lines according to the showtime parameters.

Specifically, the crosstalk information of the user lines may be calculated according to Formulas (1), (2), and (3).

Because the line terminal 52 sends the same or similar transmit power spectral density to the user lines, the $S_n^j$ and the $S_n^j$ in Formula (2) are approximately equal to each other, and the left and right sides of Formula (2) are divided by the transmit power spectral density, to obtain the crosstalk information value $$\sum_{j \neq k} |h_n^{k,j}|^2$$

in Formula (3), and $$\sum_{j \neq k} |h_n^{k,j}|^2$$

is marked as $Info_n^k$.

Because the working scenarios include long line scenarios and short line scenarios, the magnitudes of the values of the crosstalk information for the long lines and the short lines are different, so that the crosstalk information can be normalized. In the log domain, according to Formula (4), the crosstalk information $$\sum_{j \neq k} |h_n^{k,j}|^2$$

is normalized to obtain the crosstalk information value in Formula (5).

Alternatively, in the linear domain, according to Formula (6), the crosstalk information $$\sum_{j \neq k} |h_n^{k,j}|^2$$

is normalized to obtain the crosstalk information value in Formula (7).

Then, the device for managing lines 51 groups the user lines according to the crosstalk information. The user lines may be grouped according to the directly calculated crosstalk information of the user lines or according to the normalized crosstalk information of the use lines.

When the user lines are grouped according to the calculated crosstalk information of the user lines, the crosstalk information of the user lines on the frequency point is summed up, i.e., $$\sum_{n=1}^{N} Info_n^k.$$

$$\sum_{n=1}^{N} Info_n^k$$

is grouping information required by the embodiment of the present invention. Each user line has grouping information, and one or more user lines having similar grouping information are in one group. The dividing one or more user lines into groups that include user lines having the similar grouping information includes setting a certain domain value, and then dividing user lines into groups that include user lines whose grouping information difference values fall within the certain domain value. The setting of the domain value may be calculated according to the number of groups required by the users accordingly. The more the groups are required, the smaller the domain value is; and the fewer the groups are required, the larger the domain value is.

When the user lines are grouped according to the calculated crosstalk information of the user lines, curve shapes of the crosstalk information of the user lines on the frequency point are compared, and then one or more user lines having similar curve shapes or sizes are in one group.

The line terminal 52 sends the same or similar transmit power spectral density on the user lines simultaneously, collects the showtime parameters of the user lines under the transmit power spectral density, and reports the showtime parameters to the device for managing lines 51. The showtime parameters mainly include transmit power spectral density of user lines, transmission factor of direct channel, signal to noise ratio margin, loaded bit, and background noise power. After the showtime parameters are collected, the line terminal 52 sends the collected showtime parameters to the device for managing lines 51 through a DSM-D interface.

The signal to noise ratio margin, background noise power, and transmission factor of direct channel may be obtained through experiential values or an experiential model.

The device for managing lines 51 may further send an instruction for collecting showtime parameters to the line terminal 52. After receiving the instruction, the line terminal 52 sends the same or similar transmit power spectral density on the user lines, collects the showtime parameters of the user lines under the transmit power spectral density, and reports the collected showtime parameters to the device for managing lines 51.

Through the system for managing lines according to the embodiment of the present invention, the user lines are grouped, that is, each group of user lines is considered as one representative user line, and then optimized by using the DSM Level 2 optimization algorithm, for example, ISB, to calculate the optimal transmit power spectral density of each representative user line. Finally, the calculated transmit power spectral density of the representative user line is converted into a PSDMASK or a REFPSD of the group corresponding to the representative user line, and the IWF is performed on each group of user lines on the basis of the PSDs. Through grouping, the users suitable for using the same PSDMASK or REFPSD are in one group, to simplify the complexity of the DSM Level 2 optimization algorithms, and make better use of the DSM Level 2 optimization algorithms.

The method, the device, and the system for managing lines according to the embodiments of the present invention are described in detail. Persons of ordinary skill in the art can make variations and modifications to the present invention in terms of the specific implementations and application scopes according to the idea of the present invention. Therefore, the specification shall not be construed as a limit to the present invention.

What is claimed is:

1. A method for managing lines, the method comprising:
collecting showtime parameters of user lines;
calculating crosstalk information of the user lines according to the showtime parameters and Shannon Formula; and
grouping the user lines according to the crosstalk information of the user lines;
wherein grouping the user lines according to the crosstalk information of the user lines comprises:
summing the crosstalk information of the user lines on a frequency point to obtain grouping information, and dividing user lines into groups that include user lines having similar grouping information.

2. The method according to claim 1, wherein before the collecting the showtime parameters of the user lines, the method further comprises:
sending an instruction for collecting the showtime parameters of the user lines to a line terminal.

3. The method according to claim 1, wherein the collecting the showtime parameters of the user lines further comprises:
receiving the showtime parameters sent by the line terminal, wherein the showtime parameters are collected by the line terminal through sending the same or similar transmit power spectral density according to the instruction for collecting the showtime parameters of the user lines.

4. The method according to claim 1, wherein the showtime parameters comprise at least a one of: transmit power spectral density of user lines, transmission factor of direct channel, signal to noise ratio margin, background noise power, loaded bit, or signal to noise ratio.

5. The method according to claim 1, further comprising:
replacing the crosstalk information with a difference value between the crosstalk information and line attenuation or a quotient of the crosstalk information and the line attenuation.

6. The method according to claim 1, wherein the grouping the user lines according to the crosstalk information of the user lines further comprises:
comparing curve shapes of the crosstalk information of the user lines on a frequency point according to the crosstalk information of the user lines, and dividing user lines into groups that include user lines having similar curve shapes or sizes.

7. A device for managing lines, the device comprising:
a collecting unit, adapted to collect showtime parameters of user lines;
a calculating unit, adapted to calculate crosstalk information of the user lines according to the showtime parameters; and
a grouping unit, adapted to group the user lines according to the crosstalk information, wherein the grouping unit further comprises:
a summing up unit, adapted to sum up the crosstalk information of the user lines on a frequency point to obtain grouping information, and a first dividing unit, adapted to divide user lines into groups that include user lines having similar grouping information.

8. The device for managing lines according to claim 7, further comprising:
an instruction transmitting unit, adapted to transmit an instruction for collecting the showtime parameters of the user lines to a line terminal.

9. The device for managing lines according to claim 7, wherein the showtime parameters comprise at least a one of: transmit power spectral density of user lines, transmission factor of direct channel, signal to noise ratio margin, background noise power, loaded bit, or signal to noise ratio.

10. The device for managing lines according to claim 7, wherein the calculating unit is further adapted to replace the crosstalk information with a difference value between the crosstalk information and line attenuation or a quotient of the crosstalk information and the line attenuation.

11. A system for managing lines, the system comprising:
a device for managing lines, adapted to receive showtime parameters of user lines sent by a line terminal, calculate crosstalk information of the user lines according to the showtime parameters and Shannon Formula, and group the user lines according to the crosstalk information; wherein grouping the user lines according to the crosstalk information of the user lines comprises:
summing up the crosstalk information of the user lines on a frequency point to obtain grouping information, and dividing user lines into groups that include user lines having similar grouping information; and
a line terminal, adapted to collect the showtime parameters of the user lines, and send the showtime parameters to the device for managing lines.

12. The system for managing lines according to claim 11, wherein the device for managing lines is further adapted to send an instruction for collecting showtime parameters to the line terminal, and the line terminal is adapted to receive the instruction for collecting showtime parameters, collect the showtime parameters of the user lines according to the instruction for collecting showtime parameters, and send the showtime parameters to the device for managing lines.

13. A device for managing lines, the device comprising:
a collecting unit, adapted to collect showtime parameters of user lines;
a calculating unit, adapted to calculate crosstalk information of the user lines according to the showtime parameters; and
a grouping unit, adapted to group the user lines according to the crosstalk information, wherein the grouping unit further comprises:
a comparing unit, adapted to compare curve shapes of the crosstalk information of the user lines on a frequency point according to the crosstalk information of the user lines, and
a second dividing unit, adapted to divide user lines into groups that include user lines having similar curve shapes and sizes.

14. The device for managing lines according to claim 13, wherein the calculating unit is further adapted to replace the crosstalk information with a difference value between the crosstalk information and line attenuation or a quotient of the crosstalk information and the line attenuation.

* * * * *